L. C. BAYLES.
FRONT HEAD CONSTRUCTION FOR SELF ROTATING HAMMER DRILLS.
APPLICATION FILED JUNE 1, 1914.
1,126,941.   Patented Feb. 2, 1915.
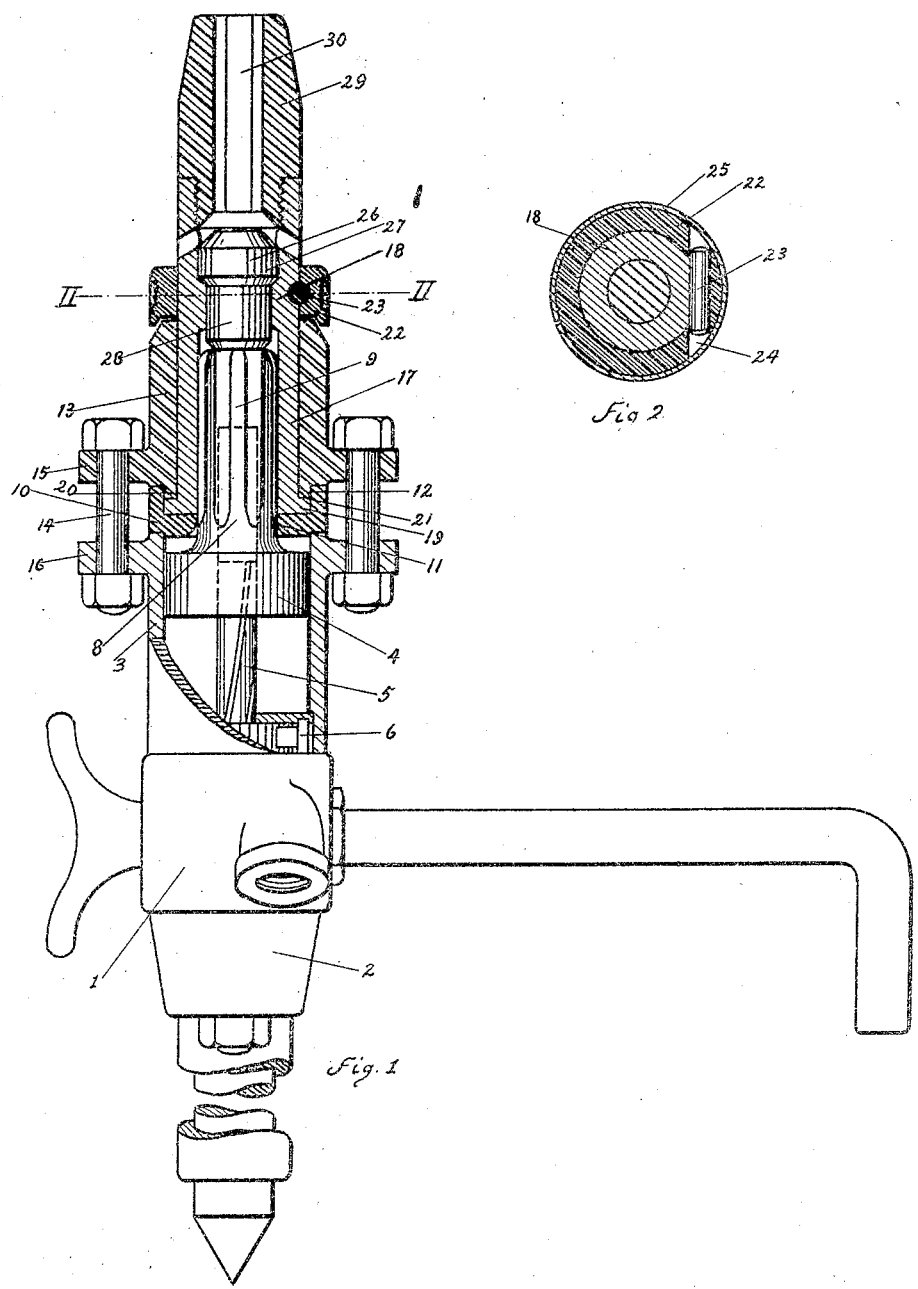

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

FRONT-HEAD CONSTRUCTION FOR SELF-ROTATING HAMMER-DRILLS.

1,126,941.

Specification of Letters Patent.    Patented Feb. 2, 1915.

Application filed June 1, 1914. Serial No. 842,149.

*To all whom it may concern:*

Be it known that I, LEWIS C. BAYLES, a citizen of the United States, residing at Easton, in the county of Northampton and State of Pennsylvania, have invented a certain new and useful Improvement in Front-Head Construction for Self-Rotating Hammer-Drills, of which the following is a specification.

This invention relates to self rotating hammer drills, and more particularly to a front head construction for drills of this type for use in stoping or other drilling where it is necessary to drill vertical holes in the roof of a stope or entry.

The object of this invention is to provide a front head construction for drills of this type which will prevent dust from the hole from penetrating into the moving parts of the drill when it is used in vertical or nearly vertical drilling.

With this object in view, a front head construction has been devised, a practical embodiment of which is represented in the accompanying drawing, in which, Figure 1 shows a longitudinal section through the drill, and Fig. 2, a transverse section on the line II—II of Fig. 1.

As shown, the drill comprises a head block 1, to one side of which is secured an air feed 2 and to the other side of which is secured a drill cylinder 3 in which reciprocates a piston 4, the movement of which is governed by any desired form of valve mechanism, (not shown).

The piston is given a step by step rotation by means of a fluted rifle bar 5, provided with the ordinary ratchet mechanism 6, this rifle bar 5 sliding in a bore 7 in the head of the piston provided with grooves which are engaged by the flutes on the rifle bar 5. On the forward end of the piston is a hammer bar extension 8 which is provided with straight flutes 9. Fitting into the forward end of the cylinder 3 is a cylinder head 10. In the rearward part of the cylinder head 10 is a bore 11 through which the hammer bar extension projects. Forward of this is a larger bore 12. Forward of the cylinder head 10 is a front head 13, which is secured by bolts 14 passing through lugs 15 to the cylinder 3, which is also provided with lugs 16 through which the bolts 14 pass.

Rotatably mounted in the front head 13 is the rearward portion 17 of a drill chuck 18. The rear end of this chuck is provided with a flange 19 which fits in the bore 12. The front head 13 is also provided with a rear extension 20 which also fits into the bore 12 and engages the forward face 21 of the flange 19.

The portion 17 of the drill chuck is bored out to receive the hammer bar extension of the piston and is also provided on its inner surface with grooves engaging the straight flutes 9 of the hammer bar extension. The chuck 18 extends back and the front cylinder head at this forward portion is of no greater diameter than the front cylinder head bore, so that the chuck can be inserted through the rear of the front head. The forward portion of the chuck 18 is surrounded by a projecting ring 22 which overlaps the front end of the front head 13 and prevents any dust falling on the front of the drill from entering the drill cylinder at the joints between these parts. The ring 22 is secured to the chuck 18 by a key 23, in key way 24. A guard spring 25 is provided to prevent the key from becoming displaced.

The forward portion of the chuck is bored out from its front end to receive the head portion 26 of a tappet 27 the shank 28 of which projects through a smaller bore into the interior of the shank portion 17 of the chuck so that it is struck by the hammer bar extension 8 of the piston 4. Threaded into the forward portion of the chuck 18 is a nose piece 29 through which is an angular longitudinal aperture 30 for the reception of the drill steel, (not shown).

The operation of the device is as follows: The rotary movement of the piston caused by the fluted rifle bar 5 will be communicated to the drill chuck 18 by means of the straight flutes 9 of the hammer bar extension of the piston, causing relative rotation between the forward portion 29 and the front head 13. With drills of ordinary construction the dust falling from the hole works down into the moving parts of the drill, quickly resulting in destructive wear of the drill. In the present form the joint between the chuck and front head is entirely covered by the protecting ring 22. By this means, and also by the rearwardly inclined passages from the tappet bore, dust is entirely prevented from entering the cylinder and affecting the moving parts.

While the chuck is here shown as rotated by the rotary movement of the piston, communicated to the chuck by the fluted forward extension of the piston, it is obvious that other means may be employed without invention for directly or indirectly rotating the chuck, and it is therefore to be understood that the present showing and description discloses only one specified modification of my invention, and other forms and modifications are included in the spirit and scope of the invention as expressed in the claims.

What I claim is:

1. In a fluid operated percussive drill, a cylinder, a front head secured to said cylinder, said front head having a bore therethrough, a drill bit receiving chuck rotatably mounted in said front head, said chuck having a flange on its rear end engaging a rearward face of said front head, and a forward portion, of no greater diameter than said front head bore, projecting beyond said front head, a ring surrounding said chuck forward portion and overlapping the front end of said front head, means for securing said ring to said chuck and means for rotating said chuck.

2. In a fluid operated percussive drill, a cylinder, a front head having a bore, a piston in said cylinder having a fluted hammer bar extension, a drill chuck rotatably mounted in said front head and having a front portion projecting therefrom, said chuck having a rearward bore provided with grooves engaging the flutes of said hammer bar extension, a forward bore and an intermediate bore of smaller diameter, a tappet in said forward bore having a shank projecting into said rearward bore in the path of said hammer bar extension, a nose piece threaded into the forward bore provided with a polygonal drill bit receiving bore, said nose piece being of no greater diameter than said front head bore, a flange on the rear end of said chuck engaging a rearward face of said front head, a ring surrounding the forward portion of said chuck and overlapping the front end of said front head, means to secure said ring to said chuck and means for rotating said piston.

In testimony whereof, I have hereunto set my hand.

LEWIS C. BAYLES.

Witnesses:
 FRED. M. SLATER,
 ARTHUR SMITH.